(12) United States Patent
Nagasawa

(10) Patent No.: US 6,449,114 B1
(45) Date of Patent: Sep. 10, 2002

(54) MAGNETIC TAPE APPARATUS

(75) Inventor: Makoto Nagasawa, Tokyo (JP)

(73) Assignee: NEC Corporation, Tokyo (JP)

(\*) Notice: Subject to any disclaimer, the term of this patent is extended or adjusted under 35 U.S.C. 154(b) by 0 days.

(21) Appl. No.: 09/375,391

(22) Filed: Aug. 17, 1999

(30) Foreign Application Priority Data

Aug. 18, 1998 (JP) .......................................... 10-231641

(51) Int. Cl.[7] .......................... G11B 19/02; G11B 15/04; G11B 5/584
(52) U.S. Cl. .............................. 360/69; 360/75; 360/60; 360/77.12
(58) Field of Search .............................. 360/75, 60, 31, 360/77.12, 78.02, 69, 260, 261.1, 261.3, 291, 291.2

(56) References Cited

U.S. PATENT DOCUMENTS 4,644,215 A \* 2/1987 Iwasaki et al. ............. 310/367
4,660,108 A \* 4/1987 Sakamoto et al.
5,923,494 A \* 7/1999 Arisaka et al. .......... 360/78.02

FOREIGN PATENT DOCUMENTS

| JP | 62-94428 | 6/1987 |
| JP | 5-209763 | 8/1993 |
| JP | 6-301949 | 10/1994 |
| JP | 8-194928 | 7/1996 |

\* cited by examiner

Primary Examiner—Andrew L. Sniezek

(57) ABSTRACT

The present invention provides a shock-resistant magnetic tape apparatus. Even if the apparatus is subjected to a shock, no data destruction is caused in adjacent tracks. The apparatus comprises: a magnetic tape 1 having a servo region for head positioning; a head holding mechanism 3 for reciprocally moving a magnetic head 2 in a direction of width of the magnetic tape 1; a head positioning mechanism 4; a main controller 11 for driving the head positioning mechanism 4 according to the servo information of the magnetic tape 1; a write control circuit 12 for controlling data write by the magnetic head; a shock sensor 13 arranged in the head holding mechanism, for detecting a predetermined shock and producing a corresponding signal; and stop signal output circuit (comparator) 16 for producing an operation stop signal to the main controller 11 and the write control circuit 12 according to the output from the shock sensor.

16 Claims, 3 Drawing Sheets

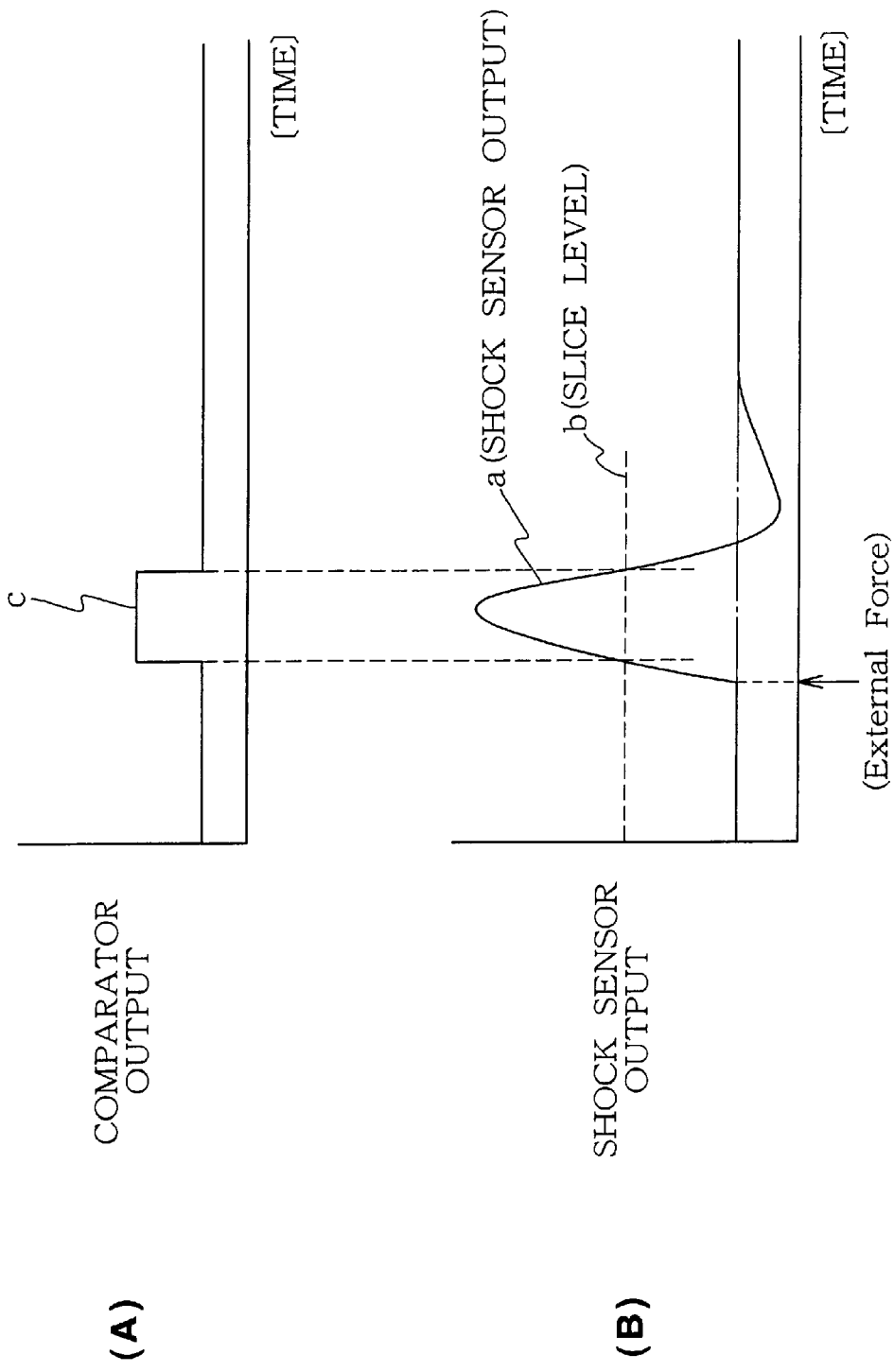

MAGNETIC TAPE APPARATUS

BACKGROUND OF THE INVENTION

1. Field of the Invention

The present invention relates to a magnetic tape apparatus and in particular, to a magnetic tape apparatus constituted in such a manner that positioning is performed according to a servo information of a magnetic tape.

2. Description of the Related Art

Conventionally, in a magnetic tape apparatus having a magnetic tape mounted, the positioning of a magnetic head with respect to the magnetic tape has been performed according to a servo information of the magnetic tape, thus increasing the recording density in the track direction.

However, in the aforementioned conventional example, when the position of the magnetic head is shifted (off track) due to an external force such as a shock, this may destroy a data in the adjacent track if data writing is in progress, or may remarkably lower the reliability of a data reproduced if data reading is in progress.

SUMMARY OF THE INVENTION

It is therefore an object of the present invention to provide a shock-resistant magnetic tape apparatus which eliminates a danger of data destruction in adjacent tracks which may be caused by an external force such as a shock. More specifically, the present invention provides a magnetic tape apparatus which eliminates data destruction of an adjacent track if data writing is in progress or recovers reliability of a reproduced data if read out is in progress when the shock is applied to the magnetic tape apparatus.

The magnetic tape apparatus according to the present invention comprises: a magnetic tape having a servo region for head positioning; a magnetic head arranged to face a recording side of the magnetic tape; a head holding mechanism for holding the magnetic head and reciprocally move the magnetic head in a width direction of the magnetic tape; and a head positioning mechanism for urging the head holding mechanism with a predetermined moving force.

The apparatus further comprises: a main controller for driving the head positioning mechanism according to a servo information recorded on the magnetic tape and controlling operation of respective components of the apparatus such as the magnetic tape running drive apparatus; and a write control circuit provided adjacent to the main controller, for controlling to write a predetermined information transmitted from an upper node apparatus to the magnetic head.

Furthermore, the apparatus comprises a shock sensor provided in the head holding mechanism for detecting a predetermined possible shock force applied to the head holding mechanism, and converts a detected shock into a predetermined signal; and a stop signal output circuit operating according to an output from the shock sensor, so as to supply a predetermined operation stop signal to the main controller and the write control circuit.

Thus, if the apparatus is subjected to a shock, the shock sensor arranged in the head holding mechanism detects the shock as an external force and the stop signal output circuit produces a predetermined operation stop signal so that the entire apparatus is disabled to write. This effectively prevents deterioration of the magnetic head and increase the durability of the entire apparatus.

The main controller may have a retry operation control function which operates as follows: upon reception of the operation stop signal from the stop signal output circuit, the main controller is immediately activated to control to stop the head positioning mechanism, the tape running drive mechanism, and other components; after a lapse of predetermined time, the main controller is again activated to activate the head positioning mechanism, the tape running drive mechanism, and the write control circuit; and after a predetermined amount of reverse drive, the respective components resume their operations at the same timing before the stop control.

This enables to assure reliability of a reproduced data during a read operation, thus improving the reliability of the entire apparatus.

Moreover, the stop signal output circuit (comparator) may have a shock value comparison function for comparing the output value from the shock sensor to a reference value from a slice level specifying circuit, and if the former is greater than the latter, producing the operation stop signal.

This enables effectively eliminate malfunction which may be caused by a noise or the like. Furthermore, the head holding mechanism may be constituted by: a head holder for holding one side of the magnetic head arranged to face a data recording surface of the magnetic tape; and a guide mechanism for guiding the head holder in a direction of the width of the magnetic tape.

This facilitates assembling and adjustment of the head holder and improves the structural accuracy.

Moreover, the head positioning mechanism may be constituted by a through hole screw formed in the head holder and extending in the direction of the head holder, a male screw engaged with the through hole screw, and a motor for urging the male screw in a normal direction or a reverse direction.

The aforementioned configuration enables to position the magnetic head quickly and accurately. Furthermore, the magnetic head can be stopped at a stable position.

Furthermore, the shock sensor may be provided on the other side (second side opposite to the first side) of the head holder.

This enables to detect a shock almost identical to the shock applied to the magnetic head.

Moreover, a spring mechanism may be provided for always urging the head holder in one direction along the guide mechanism.

This enables to smoothly adjust the position of the magnetic head which moves together with the head holder. This further improves stability of the stop position.

BRIEF DESCRIPTION OF THE DRAWINGS

FIG. 3 shows operation of a comparator (stop signal output circuit).

FIG. 3A shows an output of the comparator, and

FIG. 3B shows an output of a shock sensor.

DESCRIPTION OF THE PREFERRED EMBODIMENTS

Figure 1:
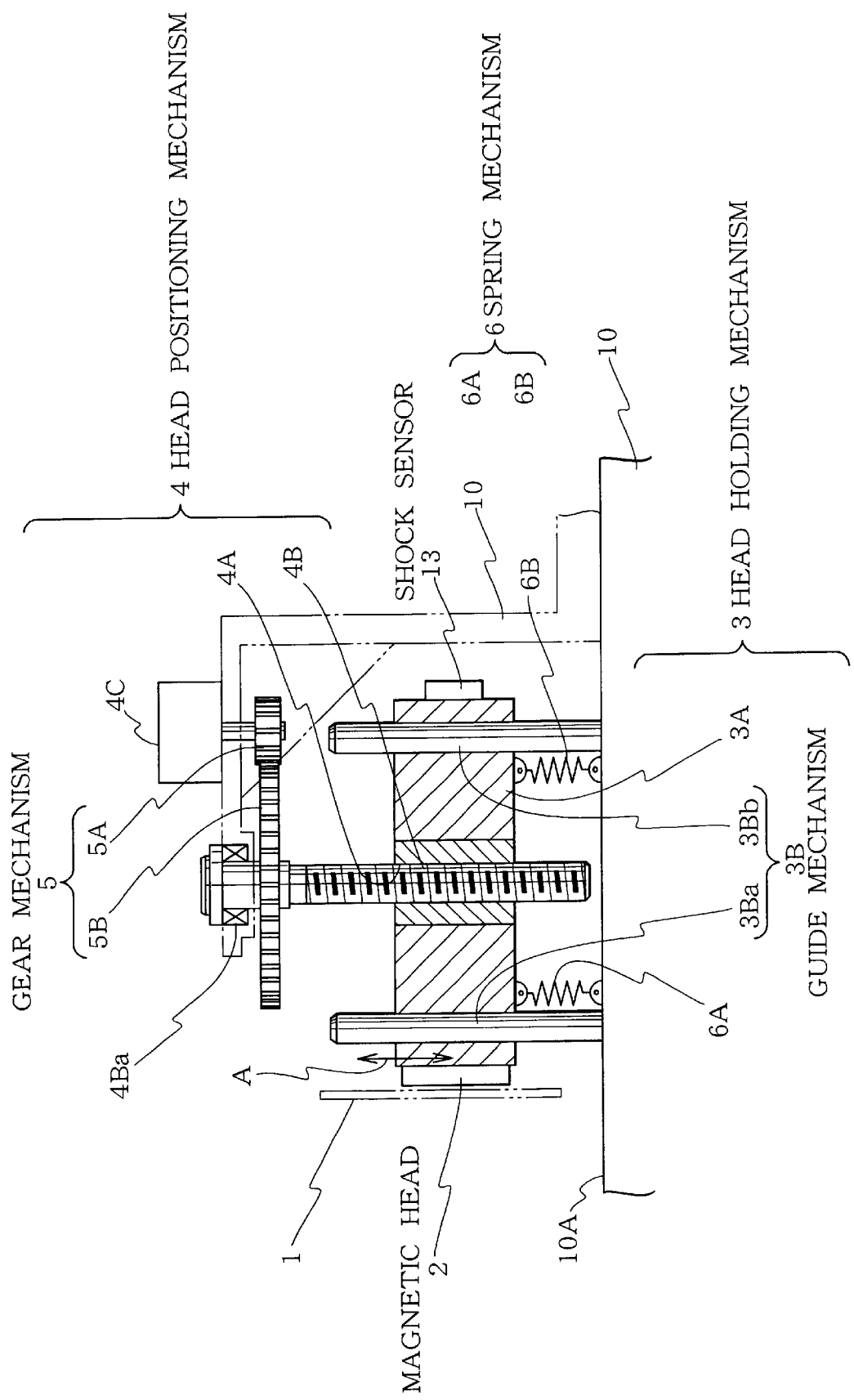
FIG. 1 is a partial cross sectional view of a magnetic tape apparatus according to a first embodiment of the present invention.
Figure 2:
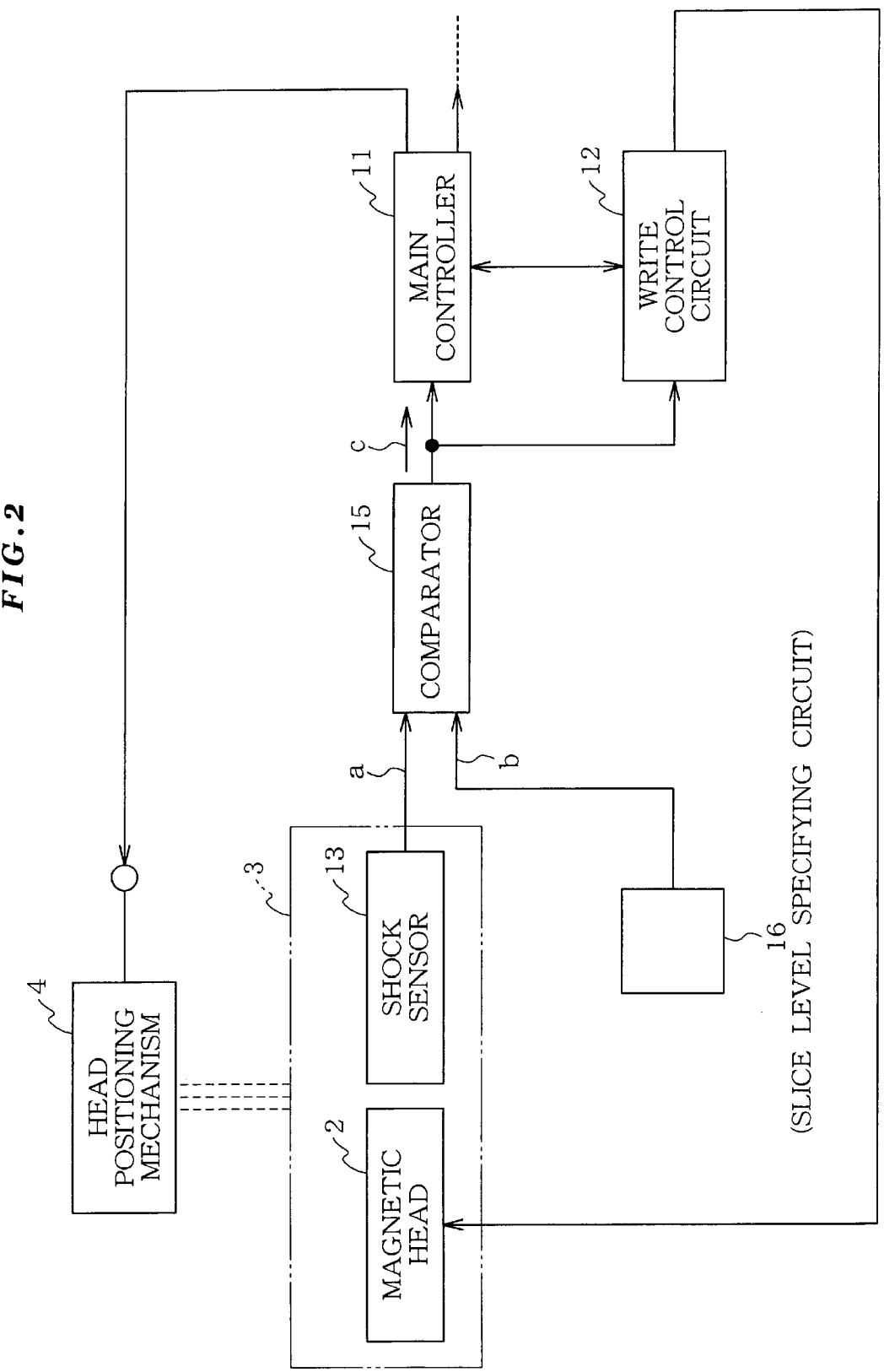
FIG. 2 is a block diagram showing an operation control system of respective components in FIG. 1.

Description will now be directed to an embodiment of the present invention with reference to FIG. 1 to FIG. 3.

As shown in FIG. 1 and FIG. 2, this embodiment comprises: a magnetic tape 1 having a servo region for head positioning; a magnetic head 2 arranged so as to oppose to a recording surface of the magnetic tape 1; a head holding mechanism 3 for holding the head 2 and reciprocally moving the magnetic head 2 in the width direction of the magnetic tape 1; and a head positioning mechanism 4 for urging the head holding mechanism 3 with a predetermined force.

The head holding mechanism 3 includes: a head holder 3A for holding one side (at right in FIG. 1) of the magnetic head 2 arranged so as to face a data recording surface of the magnetic tape 1; and a guide mechanism 3B for guiding the head holder 3A when the head moves in the width direction of the magnetic tape 1.

The guide mechanism 3B has at least two guide pins 3Ba and 3Bb partially embedded at a predetermined interval on a base surface 10A of a base member 10 of the magnetic tape apparatus. More specifically, the guide pins 3Ba and 3Bb are arranged in a direction vertical to the surface of the magnetic tape 1.

Accordingly, the head holder 3A is guided by the two guide pins 3Ba and 3Bb so as to move reciprocally in a direction vertical to base surface 10A.

Furthermore, in this embodiment, as shown in FIG. 1, the two guide pins 3Ba and 3Bb can be arranged in a direction vertical to the magnetic tape 1 and the magnetic head 2. Accordingly, even during running of the magnetic tape 1, it is possible to smoothly move the head holder 3A without causing rolling or pitching, thus enabling to perform a stable positioning with respect to a track.

Moreover, the head positioning mechanism 4 includes a through screw hole 4A formed in the head holder along the moving direction of the aforementioned head holder 3A: a male screw 4B engaged with the through screw hole 4A; and a positioning motor 4C for urging the male screw 4B to turn in normal direction or reverse direction.

Thus, the rotation of the positioning motor 4C is converted into a linear movement of the magnetic head movement direction via the combination of the through crew hole 4A and the male screw 4B.

The rotary force of this positioning motor 4C is transferred to the male screw 4B via a gear mechanism 5 having a drive gear 5A fixed to the drive shaft of the positioning motor 4C and a follower gear fixed to one end (upper end in FIG. 1) of the male screw 4B.

The male screw 4B has one end (first end) rotatably held via a bearing 4Ba by the apparatus main body; and the other end (second end) (lower end in FIG. 1) as a free end. However, it is also possible to hold the second end in a rotatable manner at the base surface 10A of the aforementioned base member 10. This drive gear 5A and the follower gear 5B constitute the gear mechanism 5.

The aforementioned head holder 3A of the head holding mechanism 3 has a spring mechanism 6 for urging the head holder 3A along the male screw 4B in one direction.

In FIG. 1, this spring mechanism 6 has two extension springs 6A and 6B. These extension springs are respectively arranged along the guide pins 3Ba and 3Bb so as to maintain the head holder 3A simultaneously and all the time pulled toward the base surface 10 of the apparatus main body. That is, the extension springs are arranged in a pressurized state.

Thus, the engagement of the through screw hole 4A with the male screw 4B is always pulled in one direction (lower end in FIG. 1). This enables to obtain a stable and smooth state without any chattering. Accordingly, the drive force of the aforementioned head positioning mechanism 4 is smoothly transferred to the head holding mechanism 3. This enables to move and set the magnetic head 2 with a highly stable accuracy. In FIG. 1, the arrow A indicates the moving direction of the magnetic head 2.

FIG. 2 shows a control system for controlling operation of the aforementioned components.

The control system includes: a main controller 11, a write control circuit 12, a shock sensor 13, a comparator 15, and a slice level specifying circuit 16.

The main controller 11 controls the entire operation of the magnetic tape apparatus. The main controller 11 controls the head positioning mechanism 4 according to a servo information recorded on the magnetic tape 1, so as to control the position of the magnetic head 2 with respect to the magnetic tape 1. The main controller 11 also controls operation of the respective components such as a tape running drive mechanism (not depicted).

The write control circuit 12 controls operation of the magnetic head 2 for writing in or reading out a predetermined information transmitted from an upper node apparatus.

Furthermore, when a predetermined shock is applied to the head holding mechanism 3, this is detected by the shock sensor 13 provided at the right end (second end) of the head holder 3A, as shown in FIG. 1, at a position almost symmetric to the magnetic head 2 with respect to the two guide pins 3Ba and 3Bb. This enables to detect a shock almost identical to that applied to the magnetic head 2.

The shock sensor 13, upon detection of a shock, converts the shock into a predetermined signal.

The comparator 15 operating according to the output from the shock sensor and sending a predetermined operation stop signal to the aforementioned main controller 11 and the write control circuit 12.

If the comparator (stop signal output circuit) 15 finds that the output value from the shock sensor 13 is greater than an reference operation value "b" produced from the slice level specifying circuit 16, the comparator immediately operates to output an operation stop signal "c" using its shock value comparison function.

Upon reception of the operation stop signal from the comparator (stop signal output circuit) 15, the main controller 11 controls to stop operations of the positioning mechanism 4 and the tape running drive mechanism (not depicted). When a predetermined time has passed, the main controller 11 controls to operate the head positioning mechanism 4, the magnetic tape running drive mechanism, and the write control circuit for a predetermined reverse drive and then resume the normal operation of the components at the same timing when the stop signal has been received. This will be referred to as a retry operation control function.

Here, the comparator 15 has a shock value comparison function for producing the aforementioned operation stop signal "c" if the output value from the shock sensor 13 is greater than a reference value "b" from the level specifying circuit 16.

Next, explanation will be given on the operation of the aforementioned embodiment.

Firstly, the head holder 3A is always pulled toward the base member 10 by the spring mechanism 6 provided between the head holder 3A and the base member 10 of the apparatus main body. In this case, the spring mechanism 6 is constituted by extension springs 6A and 6B and arranged along the guide mechanism 3B. Accordingly, the head holder 3A and the magnetic head 2 provided on the head holder 3A are pushed in one direction even during a movement. Consequently, there will be no chattering during movement or stop state. Thus, the magnetic head 2 can move and stop smoothly and accurately.

Moreover, the shock sensor 13, similarly as the magnetic head 2, is arranged on the head holder 3A. Accordingly, it is possible to directly detect a shock applied to the magnetic head 2. This shock sensor 13 produces an output "a", which is compared to a slice level signal "b" in the comparator 15, and becomes a comparator output "c".

This operation is shown in FIG. 3A and FIG. 3B. When the output "a" from the shock sensor 13 is greater than a predetermined value, the comparator outputs a square wave "c".

As shown in FIG. 3B, at the point when the shock sensor output exceeds the slice level b, the comparator output c is produced.

The comparator output "c" is also transmitted to the main controller 11 and transmitted therefrom as an external signal so as to serve as a timing signal for operation control of the entire apparatus.

That is, the main controller 11, upon reception of the comparator output "c", immediately controls to stop the head positioning mechanism 4 and the tape running drive mechanism (not depicted). Simultaneously with this, the main controller 11 actuates the retry operation control function. That is, after a lapse of predetermined time, the main controller 11 controls to actuate the head positioning mechanism 4, the magnetic tape running drive mechanism, and the write control circuit for a reverse drive of a predetermined amount. After this, the main controller 11 controls to resume the drive operation at the same timing as the timing before the stop operation.

This comparator output "c" is further supplied as a write inhibiting signal to the write control circuit 12 and the magnetic head 2 is set to a write-disabled state.

On the other hand, when the retry control function of the main controller 11 is operated, the write control circuit 12 is also actuated at the operation timing of the main controller 11, and the magnetic head 2 is again enabled to operate normal write.

Here, in the aforementioned embodiment, the head positioning mechanism 4 employs the male screw 4B, but it is also possible to use a rectangular screw and a corresponding through screw hole 4A.

Thus, in the aforementioned embodiment, an external force is detected and the apparatus is set to a write-disabled state. Simultaneously with this, the main controller 11 produces an external force application signal so as to perform the retry processing. This protects an adjacent data item as well as to guarantee a written data item. Moreover, if during a reproduction, it is possible to eliminate a read error which may lower the reliability of the ECC (error correction code).

If the magnetic tape apparatus having the aforementioned configuration is subjected to an external force such as a shock, this is immediately detected by the shock sensor, and the main controller and the write control circuit operate to set the entire apparatus into a write stop mode, and the magnetic sensor to an inhibited state. Even if this happens during a write operation, it is assured to prevent data destruction of an adjacent track.

Furthermore, when the retry operation control function of the main controller is actuated, it is possible to recover reliability of a reproduced data during a read operation. This significantly increase the reliability of the entire apparatus.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. A10-231641 (Filed on Aug. 18$^{th}$, 1998) including specification, claims, drawings and summary are incorporated herein by reference in its entirety.

What is claimed is:

1. A magnetic tape apparatus comprising:

a magnetic head arranged to face a recording side of a magnetic tape having a servo area for head positioning;

a head holding mechanism for holding the magnetic head and reciprocally move the magnetic head in a width direction of the magnetic tape;

a head positioning mechanism for urging the head holding mechanism with a predetermined moving force;

a main controller for driving the head positioning mechanism according to a servo information recorded on the magnetic tape and controlling operation of respective components of the apparatus such as the magnetic tape running drive apparatus;

write control circuit provided adjacent to the main controller, for controlling to write a predetermined information transmitted from an upper node apparatus to the magnetic head;

a shock sensor provided in the head holding mechanism for detecting a predetermined possible shock force applied to the head holding mechanism, and converts a detected shock into a predetermined signal; and a stop signal output circuit operating according to an output from the shock sensor, so as to supply a predetermined operation stop signal to the main controller and the write control circuit.

2. A magnetic tape apparatus as claimed in claim 1, wherein the main controller has a retry operation control function which operates as follows:

upon reception of the operation stop signal from the stop signal output circuit, the main controller is immediately activated to control to stop the head positioning mechanism, the tape running drive mechanism, and other components;

after a lapse of predetermined time, the main controller is again activated to activate the head positioning mechanism, the tape running drive mechanism, and the write control circuit;

and after a predetermined amount of reverse drive, the respective components resume their operations at the same timing before the stop control.

3. A magnetic tape apparatus as claimed in claim 2, wherein the stop signal output circuit has a shock value comparison function for comparing the output value from the shock sensor to a reference value from a slice level specifying circuit, and if the former is greater than the latter, producing the operation stop signal.

4. A magnetic tape apparatus as claimed in claim 3, wherein the head holding mechanism is constituted by:

a head holder for holding one side (first side) of the magnetic head arranged to face a data recording surface of the magnetic tape; and a guide mechanism for guiding the head holder in a direction of the width of the magnetic tape.

5. A magnetic tape apparatus as claimed in claim 4, wherein the shock sensor is provided on the other side (second side opposite to the first side) of the head holder.

6. A magnetic tape apparatus as claimed in claim 2, wherein the head holding mechanism is constituted by:
   a head holder for holding one side (first side) of the magnetic head arranged to face a data recording surface of the magnetic tape; and
   a guide mechanism for guiding the head holder in a direction of the width of the magnetic tape.

7. A magnetic tape apparatus as claimed in claim 6, wherein the shock sensor is provided on the other side (second side opposite to the first side) of the head holder.

8. A magnetic tape apparatus as claimed in claim 1, wherein the stop signal output circuit has a shock value comparison function for comparing the output value from the shock sensor to a reference value from a slice level specifying circuit, and if the former is greater than the latter, producing the operation stop signal.

9. A magnetic tape apparatus as claimed in claim 8, wherein the head holding mechanism is constituted by:
   a head holder for holding one side (first side) of the magnetic head arranged to face a data recording surface of the magnetic tape; and
   a guide mechanism for guiding the head holder in a direction of the width of the magnetic tape.

10. A magnetic tape apparatus as claimed in claim 9, wherein the shock sensor is provided on the other side (second side opposite to the first side) of the head holder.

11. A magnetic tape apparatus as claimed in claim 1, wherein the head holding mechanism is constituted by:
   a head holder for holding one side of the magnetic head arranged to face a data recording surface of the magnetic tape; and
   a guide mechanism for guiding the head holder in a direction of the width of the magnetic tape.

12. A magnetic tape apparatus as claimed in claim 11, wherein the shock sensor is provided on the other side (second side opposite to the first side) of the head holder.

13. A magnetic tape apparatus as claimed in claim 12, wherein the head positioning mechanism is constituted by a through hole screw, a male screw engaged with the through hole screw, and a motor for urging the male screw in a normal direction or a reverse direction.

14. A magnetic tape apparatus as claimed in claim 13, the apparatus further comprising a spring mechanism for always urging the head holder in one direction along the guide mechanism.

15. A magnetic tape apparatus as claimed in claim 11, wherein the head positioning mechanism is constituted by a through hole screw, a male screw engaged with the through hole screw, and a motor for urging the male screw in a normal direction or a reverse direction.

16. A magnetic tape apparatus as claimed in claim 15, the apparatus further comprising a spring mechanism for always urging the head holder in one direction along the guide mechanism.

* * * * *